United States Patent
Gunderson et al.

(10) Patent No.: US 9,528,601 B2
(45) Date of Patent: Dec. 27, 2016

(54) AUTOMATIC TRANSMISSION POWER FLOW DETECTION

(71) Applicant: GM Global Technology Operations LLC, Detroit, MI (US)

(72) Inventors: Joel H. Gunderson, Canton, MI (US); Rich Hathaway, Livonia, MI (US); Bradley Riedle, Northville, MI (US)

(73) Assignee: GL GLOBAL TECHNOLOGY OPERATIONS LLC, Detroit, MI (US)

( * ) Notice: Subject to any disclaimer, the term of this patent is extended or adjusted under 35 U.S.C. 154(b) by 134 days.

(21) Appl. No.: 14/321,074

(22) Filed: Jul. 1, 2014

(65) Prior Publication Data
US 2016/0003350 A1    Jan. 7, 2016

(51) Int. Cl.
| F16H 61/12 | (2010.01) |
|---|---|
| F16H 61/02 | (2006.01) |
| F16H 59/46 | (2006.01) |
| F16H 61/686 | (2006.01) |
| F16H 59/38 | (2006.01) |

(52) U.S. Cl.
CPC .......... F16H 61/0213 (2013.01); F16H 59/38 (2013.01); F16H 59/46 (2013.01); F16H 61/12 (2013.01); F16H 61/686 (2013.01); F16H 2059/465 (2013.01); F16H 2061/1208 (2013.01)

(58) Field of Classification Search
None
See application file for complete search history.

(56) References Cited

U.S. PATENT DOCUMENTS

| | | | |
|---|---|---|---|
| 5,475,595 A * | 12/1995 | Asahara | F16H 61/702 192/103 C |
| 5,873,426 A * | 2/1999 | Tabata | B60K 6/365 180/65.7 |
| 7,867,137 B2 | 1/2011 | Steinhauser et al. | |
| 7,892,124 B2 | 2/2011 | Hodjat et al. | |
| 7,957,869 B2 | 6/2011 | Popp et al. | |
| 7,983,824 B2 | 7/2011 | Steinhauser et al. | |
| 8,083,641 B2 | 12/2011 | Popp et al. | |
| 8,162,796 B2 | 4/2012 | Popp et al. | |
| 8,185,282 B2 | 5/2012 | Steinhauser et al. | |
| 8,311,712 B2 | 11/2012 | Steinhauser et al. | |
| 2002/0049116 A1* | 4/2002 | Shiiba | F16H 59/66 477/97 |
| 2006/0195243 A1* | 8/2006 | Suzuki | F16H 61/0437 701/51 |
| 2008/0234088 A1* | 9/2008 | Kawaguchi | F16H 61/12 475/16 |
| 2009/0042691 A1* | 2/2009 | Matsubara | B60K 6/383 477/80 |
| 2009/0118999 A1* | 5/2009 | Heap | B60K 6/365 701/123 |

(Continued)

Primary Examiner — Justin Holmes (57) ABSTRACT

A transmission is provided having a control module, an input member, an output member, four planetary gear sets, a plurality of coupling members, a plurality of torque transmitting devices, and at least one speed sensor assembly. Each of the planetary gear sets includes first, second and third members. The torque transmitting devices include clutches and brakes. The control module includes a control logic sequence for assuring engagement of torque transmitting mechanisms for achieving specific gear ratios between the input and output members.

15 Claims, 4 Drawing Sheets

(56) References Cited

U.S. PATENT DOCUMENTS

2009/0306867 A1* 12/2009 Nagashima ............. F16H 61/12
                                                        701/59
2010/0210395 A1*  8/2010 Phillips ................... F16H 3/666
                                                       475/275
2011/0190994 A1*  8/2011 Itazu ....................... F16H 59/70
                                                        701/60

* cited by examiner

|  | 124 | 126 | 128 | 130 | 132 | 134 | 136 |
|---|---|---|---|---|---|---|---|
| Rev | X | X |  | X |  | X |  |
| N |  |  |  |  |  |  |  |
| 1ST | X | C |  | O | X |  | X |
| 2ND | X | C | X | X |  |  | X |
| 3RD | X |  | X | X | X |  |  |
| 4TH | X |  | X | X |  | X |  |
| 5TH | X |  | X |  | X | X |  |
| 6TH | X |  |  | X | X | X |  |
| 7TH |  |  | X | X | X | X |  |
| 8TH |  | X |  | X | X | X |  |
| 9TH |  | X | X |  | X | X |  |
| 10TH |  | X | X | X |  | X |  |

Fig-7

# AUTOMATIC TRANSMISSION POWER FLOW DETECTION

FIELD

The invention relates generally to a multiple speed transmission having a plurality of planetary gear sets and a plurality of torque transmitting devices and more particularly to a transmission having a control module for executing a control logic sequence for operating the transmission.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. Within the arrangement of the transmission, for example, three friction clutches may require activation for achieving a first gear ratio. In order to achieve another gear ratio, for example a reverse gear ratio, some of the same friction clutches may require activation along with an alternative friction clutch. However, prior to actually transferring torque from the engine to the transmission, there is no mechanism in place that is capable of ensuring the correct friction clutches are engaged in order to achieve the desired gear ratio or direction of travel.

While current transmissions achieve their intended purpose, the need for new and improved transmission controls which ensure operators expectations are achieved is essentially constant. Accordingly, there is a need for an improved and reliable multiple speed transmission control system and method.

SUMMARY

A transmission is provided having an input member, an output member, a plurality of planetary gear sets, a plurality of interconnecting members, a plurality of torque transmitting mechanisms, a plurality of speed sensor assemblies, and a transmission control module. The plurality of planetary gear sets each having a first, second, and third members. The input member is connected to one of the members of one of the planetary gear sets and the output member is connected to another one of the members of one of the planetary gear sets The plurality of interconnecting members each connecting for common rotation one of the first, second, or third members of one of the planetary gear sets with another of the first, second, or third members of another planetary gear set. The plurality of torque transmitting mechanisms each selectively connect one of the first, second, or third members of one of the planetary gear sets with another of the first, second, or third members of a planetary gear set or a stationary member. Each of the plurality of speed sensor assemblies have a speed sensor and a speed sensor ring and are disposed on one of the first, second, or third members of one of the planetary gear sets or one of the interconnecting members. The transmission control module has a control logic sequence, wherein the control module operates to control engagement of each of the plurality of torque transmitting mechanisms. Each of the speed sensors are capable of detecting a rotational speed of the corresponding speed sensor ring and sending a speed signal to the transmission control module. The torque transmitting mechanisms are selectively engageable in combinations of two or more to establish a plurality of forward speed gear ratios and a reverse speed ratio between the input member and the output member.

In another example of the present invention, a first of the plurality of speed sensor assemblies has a first speed sensor ring disposed on a third member of a first of the plurality of planetary gear sets and a first speed sensor of the first of the plurality of speed sensor assemblies detects the rotational speed and direction of the third member of the first of the plurality of planetary gear sets.

In yet another example of the present invention, a second of the plurality of speed sensor assemblies has a second speed sensor ring disposed on a second member of a second of the plurality of planetary gear sets and a second speed sensor of the second of the plurality of speed sensor assemblies detects the rotational speed and direction of the second member of the second of the plurality of planetary gear sets.

In yet another example of the present invention, a third of the plurality of speed sensor assemblies has a third speed sensor ring disposed on a first of the plurality of interconnecting members and a third speed sensor of the third of the plurality of speed sensor assemblies detects the rotational speed and direction of the first of the plurality of interconnecting members.

In yet another example of the present invention, a fourth of the plurality of speed sensor assemblies has a fourth speed sensor ring disposed on a second member of a fourth of the plurality of planetary gear sets and a fourth speed sensor of the second of the plurality of speed sensor assemblies detects the rotational speed and direction of the second member of the fourth of the plurality of planetary gear sets.

In yet another example of the present invention, a first, a second, a fourth, and a sixth of the plurality of torque transmitting mechanisms are engageable to establish the reverse speed gear ratio and the first, the second, the fourth, and a fifth of the plurality of torque transmitting mechanisms are engageable to establish a first of the plurality of speed gear ratios.

In yet another example of the present invention, the control logic sequence includes a first control logic for detecting a transmission gear selection of the operator or driver, a second control logic for deciding if the gear selection was for a reverse gear ratio or a forward gear ratio, directing the controller to continue to a third control logic if the reverse gear ratio is selected and directing the controller to continue to a seventh control logic if the forward gear ratio is selected, the third control logic directs the transmission hydraulic controller to engage the second, the fourth, and the sixth of the plurality of the torque transmitting mechanisms, a fourth control logic for detecting a slip speed of the third member of the first of the plurality of planetary gear sets, a fifth control logic for directing the transmission hydraulic controller to engage the first of the plurality of the torque transmitting mechanisms if the slip speed indicates the reverse gear ratio or for returning the controller to the first control logic if the slip speed does not indicate the reverse gear ratio, a sixth control logic for returning to the first control logic, the seventh control logic directs the transmission hydraulic controller to engage the second, the fourth, and the fifth of the plurality of the torque transmitting mechanisms, an eighth control logic for detecting the slip speed of the third member of the first of the plurality of planetary gear sets, a ninth control logic for directing the transmission hydraulic controller to engage the first of the plurality of the torque transmitting mechanisms if the slip speed of the third member of the first of the plurality of planetary gear sets indicates a forward gear ratio or for returning the controller to the first control logic if the slip speed does not indicate a forward gear ratio, and a tenth control logic for returning to the first control logic.

In yet another example of the present invention, the first of the plurality of interconnecting members connects for common rotation a member of the first of the plurality of planetary gear sets with a member of the fourth of the plurality of planetary gear sets, the second of the plurality of interconnecting members connects for common rotation a member of the first of the plurality of planetary gear sets with a member of the second of the plurality of planetary gear sets, the third of the plurality of interconnecting members connects for common rotation a member of the second of the plurality of planetary gear sets with a member of the third of the plurality of planetary gear sets, and the fourth of the plurality of interconnecting members connects for common rotation a member of the third of the plurality of planetary gear sets and a member of the fourth of the plurality of planetary gear sets.

In yet another example of the present invention, the first of the plurality of torque transmitting mechanisms is selectively engageable to connect a member of the first of the plurality of planetary gear sets with the stationary member, the second of the plurality of torque transmitting mechanisms is selectively engageable to connect another member of the first of the plurality of planetary gear sets with the stationary member, a third of the plurality of torque transmitting mechanisms is selectively engageable to connect a member of the third of the plurality of planetary gear sets with an intermediate member, the fourth of the plurality of torque transmitting mechanisms is selectively engageable to connect another member of the third of the plurality of planetary gear sets with an intermediate member, the fifth of the plurality of torque transmitting mechanisms is selectively engageable to connect the another member of the third of the plurality of planetary gear sets with a member of the second of the plurality of planetary gear sets, and the sixth of the plurality of torque transmitting mechanisms is selectively engageable to connect the first of the plurality of interconnecting members with the intermediate member.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
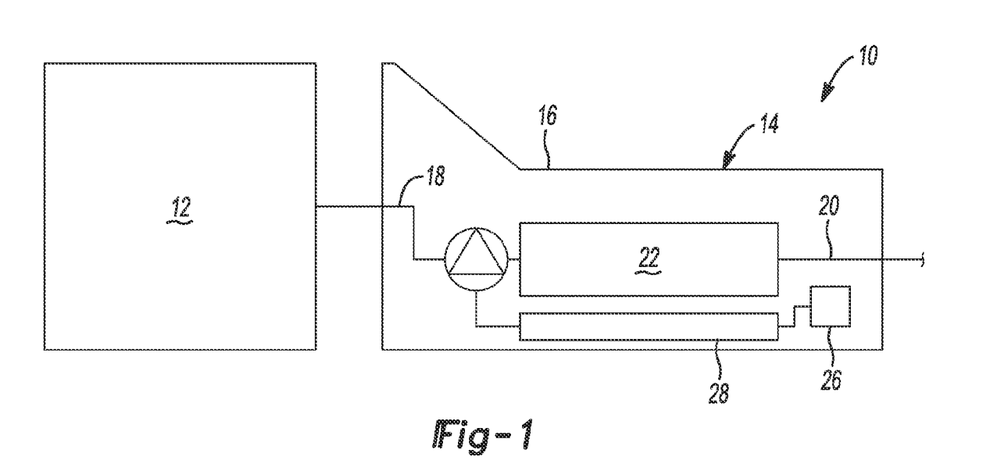
FIG. 1 is a schematic of a powertrain for a vehicle according to the present disclosure.

With reference to FIG. 1, an exemplary powertrain is generally indicated by reference number 10. The powertrain includes an engine 12 connected to a transmission 14. The engine 12 may be a conventional internal combustion engine or an electric engine, or any other type of prime mover, without departing from the scope of the present disclosure. In addition, additional components, such as hydrodynamic fluid driving devices such as torque converters and fluid couplings, may be disposed between the engine 12 and the transmission 14 without departing from the scope of the present disclosure. The engine 12 supplies a driving torque to the transmission 14.

The transmission 14 includes a typically cast, metal housing 16 which structurally encloses and protects the various components of the transmission 14. The housing 16 includes a variety of apertures, passageways, shoulders and flanges which position and support these components. The transmission 14 includes an input shaft 18, an output shaft 20, and a gear and clutch arrangement 22. It should be appreciated that while the transmission 14 is illustrated as a rear wheel drive transmission, the transmission 14 may have other configurations without departing from the scope of the present disclosure. The input shaft 18 is connected with the engine 12 and receives input torque or power from the engine 12. The output shaft 20 is preferably connected with a final drive unit (not shown) which may include, for example, propshafts, differential assemblies, and drive axles. The input shaft 18 is coupled to and provides drive torque to the gear and clutch arrangement 22.

At the outset, it should be appreciated that the embodiments of the gear and clutch arrangement 22 of the transmission 14 of the present invention have an arrangement of permanent mechanical connections between the elements of the four planetary gear sets. A first component or element of a first planetary gear set is permanently coupled to a first component or element of a second planetary gear set. A second component or element of the first planetary gear set is permanently coupled to a third component or element of a fourth planetary gear set. A third component or element of the second planetary gear set is permanently coupled to a first component or element of a third planetary gear set. A third component or element of the third planetary gear set is permanently coupled to a first component or element of the fourth planetary gear set. Furthermore, the embodiments of the present invention include a number of selectable mechanical connections between members of the planetary gear sets, the transmission housing, or other rotating members. For example, a third component or element of the first planetary gear set is connectable to the transmission housing. A first component or element of the first planetary gear set is connectable to the transmission housing. A first component or element of the third planetary gear set is connectable to a rotating member. A second component or element of the third planetary gear set is connectable to the rotating member. A third component or element of the fourth planetary gear set is connectable to the rotating member. A second component or element of the second planetary gear set is connectable to a third member of the third planetary gear set.

Figure 2:
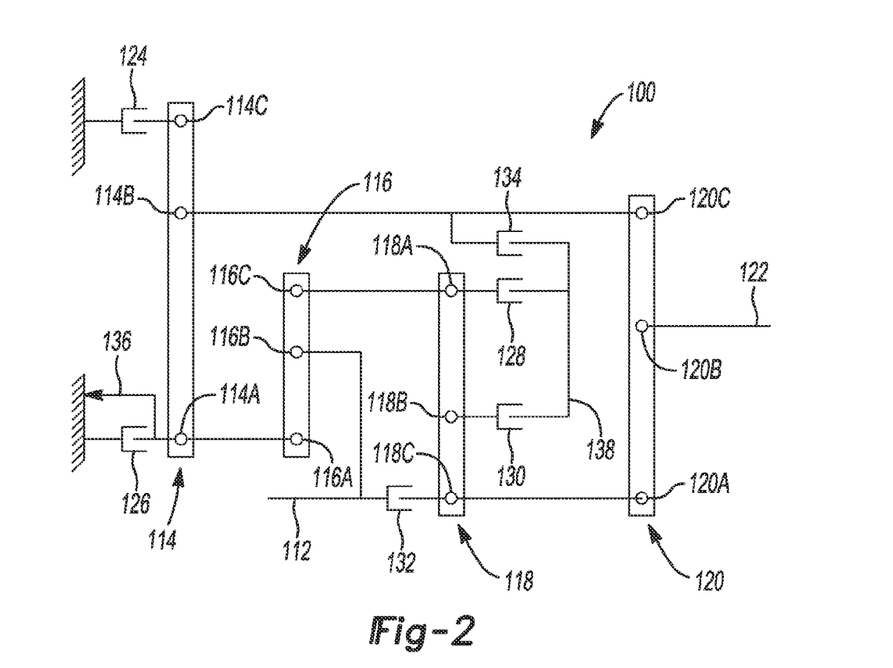
FIG. 2 is a lever analogy diagram of an embodiment of a ten speed transmission according to the present invention.

Referring now to FIG. 2, an embodiment of a ten speed transmission 100 is illustrated in a lever analogy diagram format. A lever analogy diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever analogy diagrams can be found in SAE Paper 810102, "The Lever Analogy: A New Tool in Transmission Analysis" by Benford and Leising which is hereby fully incorporated by reference.

The transmission 100 includes an input shaft or member 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 1188 and a third node 118C, a fourth planetary gear set 120 having three nodes: a first node 120A, a second node 120B and a third node 120C and an output shaft or member 122.

The input member 112 is coupled to the second node 116B of the second planetary gear set 116. The output member 122 is coupled to the second node 120B of the fourth planetary gear set 120. The second node 114B of the first planetary gear set 114 is coupled to the third node 120C of the fourth planetary gear set 120. The first node 114A of the first planetary gear set 114 is coupled to the first node 116A of the second planetary gear set 116. The third node 116C of the second planetary gear set 116 is coupled to the first node 118A of the third planetary gear set 118. The third node 118C of the third planetary gear set 118 is coupled to the first node 120A of the fourth planetary gear set 120.

A first brake 124 selectively connects the third node 114C of the first planetary gear set 114 with a stationary member or transmission housing 150. A second brake 126 selectively connects the first node 114A of the first planetary gear set 114 with the stationary member or transmission housing 150. A first clutch 128 selectively connects the first node 118A of the third planetary gear set 118 to an intermediate member 138. A second clutch 130 selectively connects the third node 118C of the third planetary gear set 118 with the intermediate member 138. A third clutch 132 selectively connects the third node 118C of the third planetary gear set 118 to the second node 116B of the second planetary gear set 116 and the input member 112. A fourth clutch 134 selectively connects the second node 114B of the first planetary gear set 114 and the third node 120C of the fourth planetary gear set 120 with the intermediate member 138. A one-way clutch 136 connects the first node 114A of the first planetary gear set 114 to the stationary member or transmission housing 150 when the first node 114A of the first planetary gear set 114 is rotating in a first direction.

Figure 3:
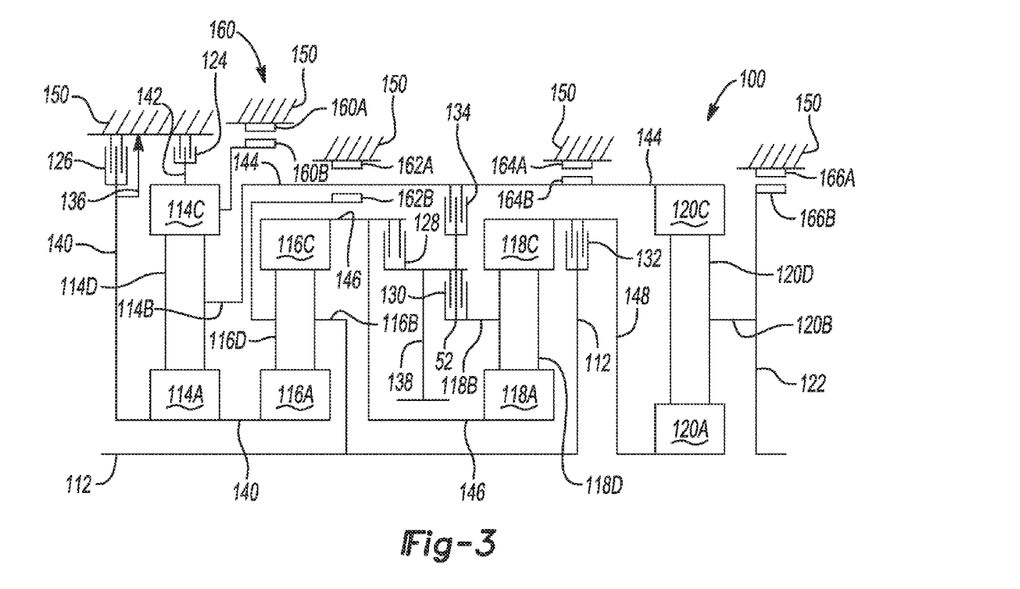
FIG. 3 is a diagrammatic illustration of an embodiment of a ten speed transmission according to the present invention.

Referring now to FIG. 3, a stick diagram presents a schematic layout of the embodiment of the ten speed transmission 100 according to the present invention. In FIG. 3, the numbering from the lever analogy diagram of FIG. 2 is carried over. The clutches and couplings are correspondingly presented whereas the nodes of the planetary gear sets now appear as components of planetary gear sets such as sun gears, ring gears, planet gears and planet gear carriers.

For example, the planetary gear set 114 includes a sun gear member 114A, a ring gear member 114C and a planet gear carrier member 114B that rotatably supports a set of planet gears 114D (only one of which is shown). The sun gear member 114A is connected for common rotation with a first interconnecting shaft or member 140. The ring gear member 114C is connected for common rotation with a second interconnecting shaft or member 142. The planet gear carrier member 114B is connected for common rotation with a third interconnecting shaft or member 144. The set of planet gears 114D are configured to intermesh with both the sun gear member 114A and the ring gear member 114C.

The planetary gear set 116 includes a sun gear member 116A, a ring gear member 116C and a planet gear carrier member 116B that rotatably supports a set of planet gears 116D (only one of which is shown). The sun gear member 116A is connected for common rotation with the first interconnecting shaft or member 140. The ring gear member 116C is connected for common rotation with a fourth interconnecting shaft or member 146. The planet carrier member 116B is connected for common rotation with the input member 112. The planet gears 116D are configured to intermesh with both the sun gear member 116A and the ring gear member 116C.

The planetary gear set 118 includes a sun gear member 118A, a ring gear member 118C and a planet gear carrier member 118B that rotatably supports a set of planet gears 118D (only one of which is shown). The sun gear member 118A is connected for common rotation with the fourth interconnecting shaft or member 146. The ring gear member 118C is connected for common rotation with a fifth interconnecting shaft or member 148. The planet carrier member 118B is connected for common rotation with a sixth interconnecting shaft or member 152. The planet gears 118D are configured to intermesh with both the sun gear member 118A and the ring gear member 118C.

The planetary gear set 120 includes a sun gear member 120A, a ring gear member 120C and a planet gear carrier member 120B that rotatably supports a set of planet gears 120D (only one of which is shown). The sun gear member 120A is connected for common rotation with the fifth interconnecting shaft or member 148. The ring gear member 120C is connected for common rotation with the third interconnecting shaft or member 144. The planet carrier member 120B is connected for common rotation with the output member 122. The planet gears 120D are configured to intermesh with both the sun gear member 120A and the ring gear member 120C.

The input shaft or member 112 is continuously connected to an engine (not shown), a turbine of a torque converter (not shown), or an output of a clutch. The output shaft or member 122 is continuously connected with the final drive unit or transfer case (not shown).

The torque-transmitting mechanisms or brakes 124, 126, clutches 128, 130, 132, 134, and one-way clutch 136 allow for selective interconnection of the shafts or interconnecting members, members of the planetary gear sets and the housing. For example, the first brake 124 is selectively engageable to connect the first interconnecting shaft or member 140 with the stationary member or the transmission housing 150 in order to restrict the first interconnecting shaft or member 140 from rotating relative to the stationary member or transmission housing 150. The second brake 126 is selectively engageable to connect the second interconnecting shaft or member 142 with the stationary member or the transmission housing 150 in order to restrict the second interconnecting shaft or member 142 from rotating relative to the stationary member or transmission housing 150. The first clutch 128 is selectively engageable to connect the fourth interconnecting shaft or member 146 with an intermediate interconnecting shaft or member 138. The second clutch 130 is selectively engageable to connect the sixth interconnecting shaft or member 152 with the intermediate interconnecting shaft or member 138. The third clutch 132 is selectively engageable to connect the fifth interconnecting shaft or member 148 with the input member 112. The fourth clutch 134 is selectively engageable to connect the third interconnecting shaft or member 144 with the intermediate interconnecting shaft or member 138. The one-way clutch 136 is engageable to connect the first interconnecting shaft or member 140 with the stationary member or the transmission housing 150 when torque is applied to the first interconnecting shaft or member 140 in a first rotational direction in order to restrict the second interconnecting shaft or member 142 from rotating relative to the stationary member or transmission housing 150.

Figure 4:
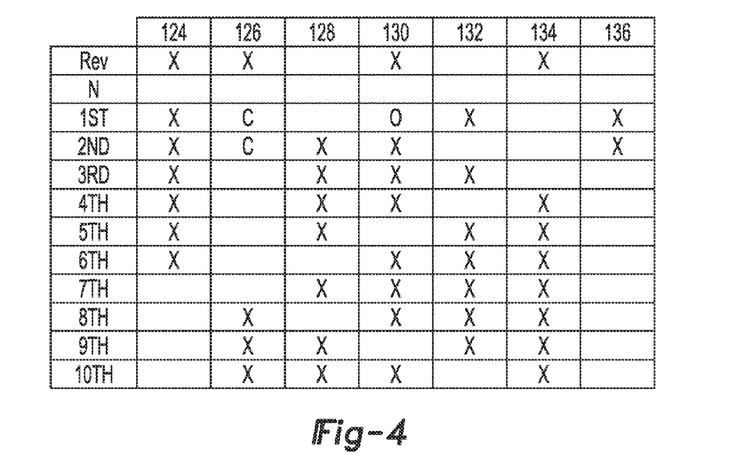
FIG. 4 is a truth table presenting the state of engagement of the various torque transmitting elements in each of the available forward and reverse speeds or gear ratios of the transmission illustrated in FIGS. 1 and 2.

Referring now to FIG. 3 and FIG. 4, the operation of the embodiment of the ten speed transmission 100 will be described. It will be appreciated that transmission 100 is capable of transmitting torque from the input shaft or member 112 to the output shaft or member 122 in at least ten forward speed or torque ratios and at least one reverse speed or torque ratio with triple overdrive. Each forward and reverse speed or torque ratio is attained by engagement of one or more of the torque-transmitting mechanisms (i.e. first brake 124, second brake 126, first clutch 128, second clutch 130, third clutch 132, fourth clutch 134, and one-way clutch 136), as will be explained below. FIG. 4 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 100.

To establish a reverse gear, the first brake 124, the second brake 126, the second clutch 130, and the fourth clutch 134 are engaged or activated. The first brake 124 connects the second interconnecting shaft or member 142 with the stationary member or transmission housing 150 in order to restrict the ring gear member 114C from rotating relative to the stationary member or transmission housing 150. The second brake 126 connects the first interconnecting shaft or member 140 with the stationary member or transmission housing 150 in order to restrict the sun gear member 114A from rotating relative to the stationary member or transmission housing 150. The second clutch 130 connects the sixth interconnecting shaft or member 152 with the intermediate member 138. The fourth clutch 134 connects the fifth interconnecting shaft or member 148 with the input member 112. Likewise, the ten forward ratios are achieved through different combinations of clutch and brake engagement, as shown in FIG. 4.

Referring now back to FIG. 2, in addition to the stick diagram presents a schematic layout of the embodiment of the ten speed transmission 100 according to the present invention. The transmission 100 further includes a first, a second, a third, and a fourth speed sensor assemblies 160, 162, 164, 166. Each of the speed sensor assemblies 160, 162, 164, 166 include a speed sensor 160A, 162A, 164A, 166A and a speed sensor ring 160B, 162B, 164B, 166B. The speed sensors 160A, 162A, 164A, 166A are fixedly attached to the transmission housing 150. The speed sensors 160A, 162A, 164A, 166A are conventional speed sensors such as Hall Effect sensors or variable reluctance sensors and the like. The speed sensor rings 160B, 162B, 164B, 166B are in close proximity to the respective speed sensors 160A, 162A, 164A, 166A and are fixedly attached to one of the rotatable shafts or members of transmission 110. The speed sensors 160A, 162A, 164A, 166A detect the presence of the respective speed sensor ring 160B, 162B, 164B, 166B to count the revolutions of the shaft or interconnecting member to which the speed sensor ring 160B, 162B, 164B, 166B is attached. Alternatively, the speed sensor rings 160B, 162B, 164B, 166B are magnetic strips or toothed portions of shafts having magnetic material formed in the rotatable shafts or members of transmission 110.

For example, the first speed sensor 160A is fixedly attached to the transmission housing 150 and the first speed sensor ring 160B is fixedly disposed on the third member 114C of the first planetary gear set 114 or the second interconnecting shaft or member 142. The second speed sensor 162A is fixedly disposed on the transmission housing 150 and the second speed ring 162B is fixedly disposed on the second member 116B of the second planetary gear set 116 or the input member 112. The third speed sensor 164A is fixedly disposed on the transmission housing 150 and the third speed sensor ring 164B is fixedly disposed on the third interconnecting shaft or member 144. The fourth speed sensor 166A is fixedly disposed on the transmission housing 150 and the third speed sensor ring 166B is fixedly disposed on the output shaft 114.

Figure 5:
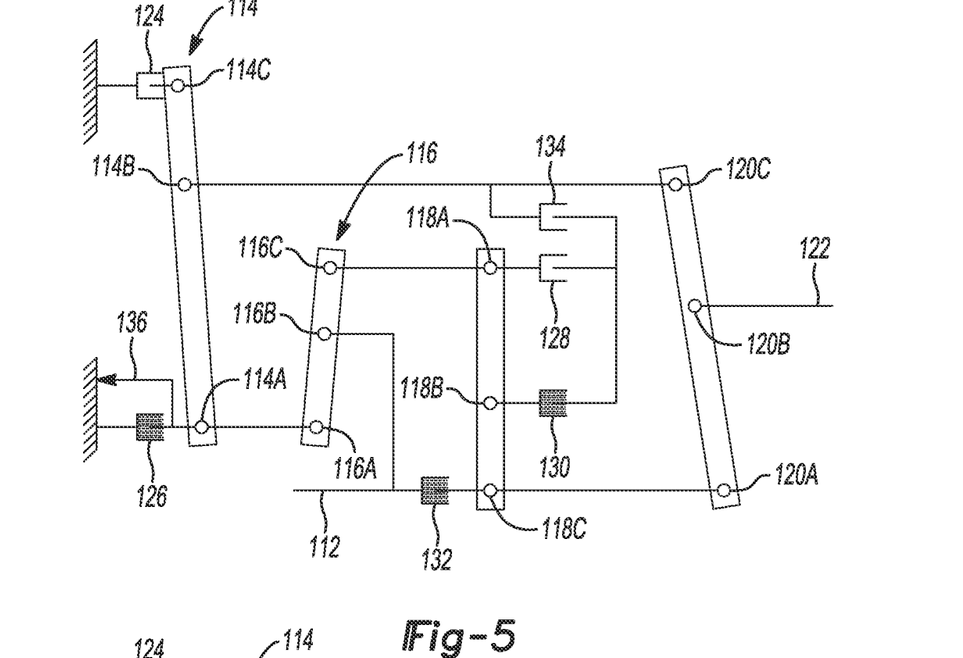
FIG. 5 is a diagrammatic illustration of an embodiment of a ten speed transmission configured for a forward drive mode or first gear ratio according to the present invention.
Figure 6:
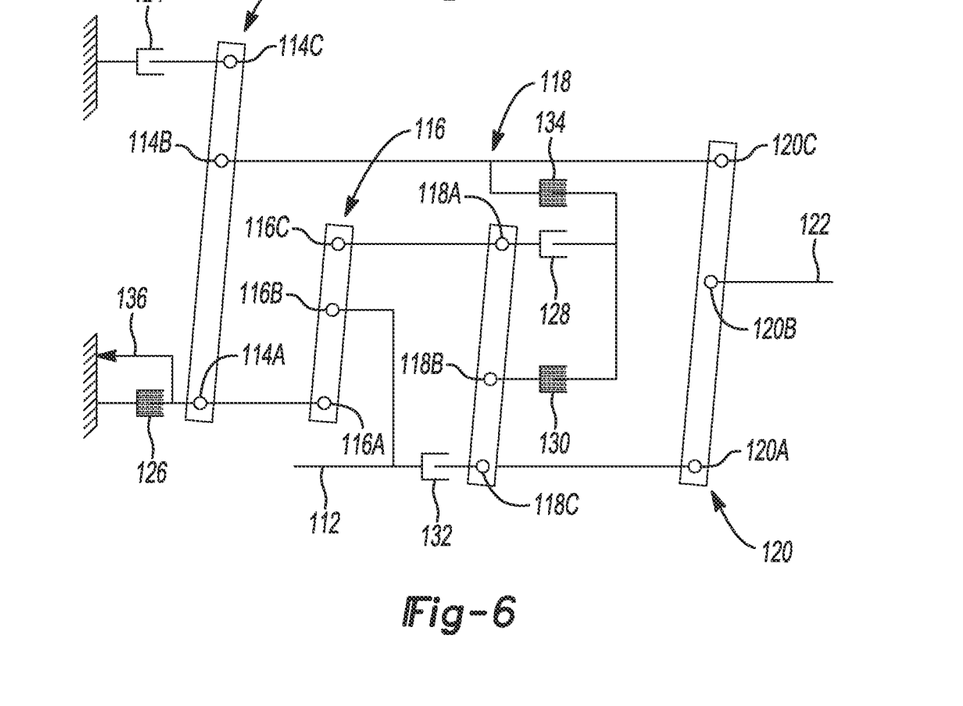
FIG. 6 is a diagrammatic illustration of an embodiment of a ten speed transmission configured for a reverse drive mode or reverse gear ratio according to the present invention.

Referring now to FIGS. 4, 5, and 6, an embodiment of a ten speed transmission 100 is illustrated in a lever analogy diagram format depicting a configuration in preparation for first gear ratio engagement in FIG. 5 and a configuration in preparation for reverse gear ratio engagement in FIG. 6. As shown in the truth table of FIG. 4, power flow through a first gear ratio is achieved by engaging the first and second brakes 124, 126, the third clutch 132, and the one-way clutch 136. As shown in FIG. 5, however, the lever depicts only brake 126 and clutches 132, 136 as being engaged and that the clutch slip speed across the first brake 124 is of a specific proportion relative to speed of elements 112 and 122 measured by the speed sensors. For the case of the output shaft or member 122 having no rotational speed, the slip speed across the first brake 124 will be negative indicating the clutches and brakes applied will result in a forward power flow when the first brake 124 is applied. Alternatively, FIG. 4 shows that power flow through a reverse gear ratio is achieved by engaging the first and second brakes 124, 126, the second clutch 130, and the fourth clutch 134. Additionally, FIG. 6 shows the lever depicting only second brake 126 and second and fourth clutches 130, 134 as being engaged and that the clutch slip speed across the first brake 124 is of a specific proportion relative to speed of the input and output shaft or members 112, 122 as measured by the speed sensors. For the case of the output shaft or member 122 having no rotational speed, the slip across the first brake 124 will be positive indicating the clutches and brakes applied will result in a reverse power flow when the first brake 124 is applied. The slip speed across the first brake 124 is uniquely different between the embodiments of FIG. 5 and FIG. 6 for the same speed conditions of the input and output shaft or members 112, 122. For cases where the output shaft or member 122 has a rotational speed, a different slip speed will result across the first brake 124 which remains uniquely different between the embodiments of FIG. 5 and FIG. 6.

Referring now back to FIG. 1, the transmission 14 also includes a transmission control module 26. The transmission control module 26 is preferably an electronic control device having a preprogrammed digital computer or processor, control logic, memory used to store data, and at least one I/O peripheral. The control logic includes a plurality of logic routines for monitoring, manipulating, and generating data. The transmission control module 26 controls the actuation of the plurality of torque transmitting mechanisms via a hydraulic control system 28 according to the principles of the present disclosure. The control logic may be implemented in hardware, software, or a combination of hardware and software. For example, control logic may be in the form of program code that is stored on the electronic memory storage and executable by the processor. The transmission controller 26 receives the output signal of each of the speed sensors 160A, 162A, 164A, 166A, performs the control logic and sends command signals to a hydraulic control system 28. The hydraulic control system 28 receives command signals from the transmission controller 26 and converts the command signals to hydraulic signals to control the actuation of the brakes and clutches 124, 126, 128, 130, 132, 134.

For example, a control logic implemented in software program code that is executable by the processor of the transmission controller 26 includes a first control logic detecting the direction selection, forward or reverse, of the operator or driver, a second control logic for deciding if the gear selection was for a reverse gear ratio or a forward or first gear ratio, directing the controller to continue to the third control logic if the reverse gear ratio is selected and directing the controller to continue to the seventh control logic if the forward or first gear ratio is selected, a third control logic for directing the transmission hydraulic controller to engage some of the reverse gear ratio torque transmitting devices including the second brake 126, the second clutch 130, and the fourth clutch 134 if the reverse gear ratio selection is detected, a fourth control logic for detecting the slip speed of the ring gear 114C of the first planetary gear set 114, a fifth control logic for directing the transmission hydraulic controller to engage the first brake 124 if the slip speed is negative or for returning the controller to the first control logic if the slip speed is positive, a sixth control logic for returning to the first control logic when the vehicle returns to rest, a seventh control logic for directing the transmission hydraulic controller to engage some of the forward or first gear ratio torque transmitting devices including the second brake 126, the second clutch 130, and the third clutch 132 if the forward or first gear ratio selection is detected, an eighth control logic for detecting the slip speed of the ring gear 114C of the first planetary gear set 114, a ninth control logic for directing the transmission hydraulic controller to engage the first brake 124 if the slip speed corresponds to a forward gear configuration or for returning the controller to the first control logic if the slip speed corresponds to a reverse gear configuration, and a tenth control logic for returning to the first control logic when the vehicle returns to rest.

Figure 7:
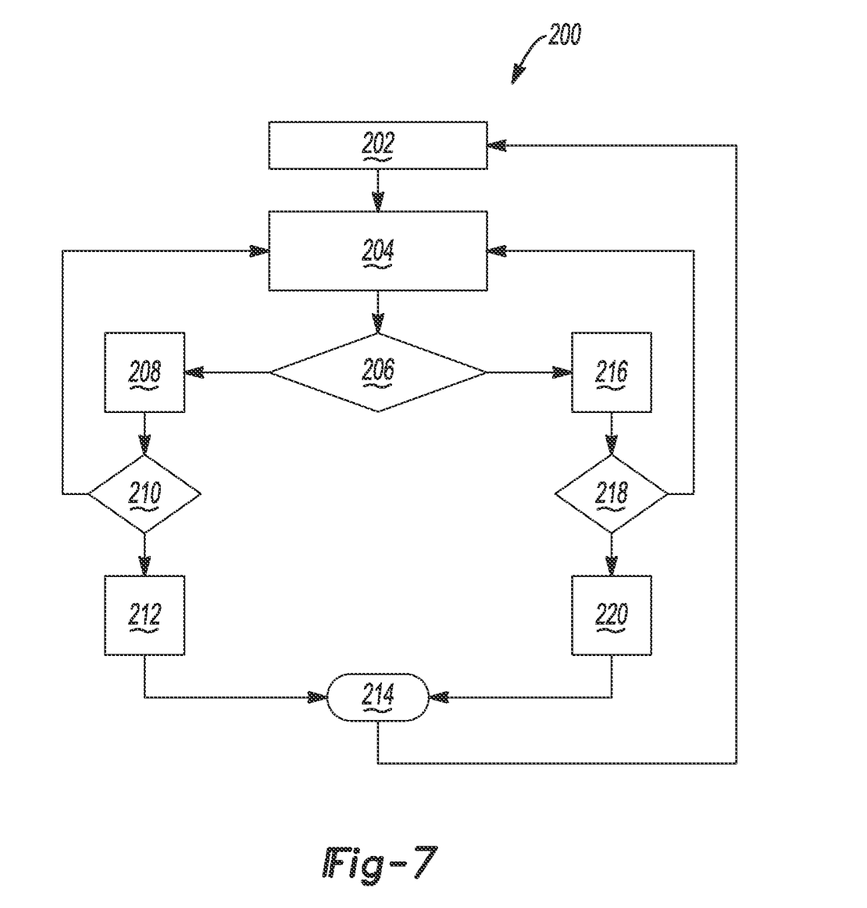
FIG. 7 is a flow chart depicting a method of operating a ten speed transmission according to the present invention.

Referring now to FIG. 7, a flow chart depicting a method 200 for operating an embodiment of the transmission 200 is illustrated. However, the method 200 can be adapted to other transmission arrangements without departing from the scope of the invention. The method 200 begins with a vehicle at rest 202. A first step 204 of the method detects the gear selection of the operator or driver. A second step 206 decides if the gear selection was for a reverse gear ratio or for a forward or first gear ratio. If the gear selection was for a reverse gear ratio the method continues to a third step 208. The third step 208 of the method directs the transmission hydraulic controller to engage some of the reverse gear ratio torque transmitting devices including the second brake 126, the second clutch 130, and the fourth clutch 134. A fourth step 210 of the method 200 the controller detects the slip speed of the ring gear 124C of the first planetary gear set 124. If the slip speed corresponds to a reverse gear configuration, then the method continues to a fifth step 212 of the method 200. If the slip speed does not corresponds to a reverse gear configuration, then the method returns to the first step 202 of the method 200. The fifth step 212 of the method 200 directs the transmission hydraulic controller to engage the first brake 124. A sixth step 214 of the method 200 returns to the first step 202 of the method 200 when the vehicle returns to rest. If the gear selection was for a forward or first gear ratio the method continues to a seventh step 216. The seventh step 216 of the method directs the transmission hydraulic controller to engage some of the first gear ratio torque transmitting devices including the second brake 126, the second clutch 130, and the third clutch 132. An eighth step 218 of the method 200 the controller detects the slip speed of the ring gear 124C of the first planetary gear set 124. If the slip speed corresponds to a forward gear configuration, then the method continues to a ninth step 220 of the method 200. If the slip speed does not corresponds to a forward gear configuration, then the method returns to the first step 202 of the method 200. The ninth step 220 of the method 200 directs the transmission hydraulic controller to engage the first brake 24. After the ninth step 220, the method continues to the sixth step 214 which returns the method back to the first step 202 when the vehicle returns to rest.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission for a vehicle, the transmission including:
   - an input member;
   - an output member;
   - a plurality of planetary gear sets each having a first, second, and third members, and wherein the input member is connected to one of the members of one of the planetary gear sets and the output member is connected to another one of the members of one of the planetary gear sets;
   - a plurality of interconnecting members each connecting for common rotation one of the first, second, or third members of one of the planetary gear sets with another of the first, second, or third members of another planetary gear set;
   - a plurality of torque transmitting mechanisms each selectively connecting one of the first, second, or third members of one of the planetary gear sets with another of the first, second, or third members of a planetary gear set or a stationary member, and wherein a first, a second, a fourth, and a sixth of the plurality of torque transmitting mechanisms are engageable to establish the reverse speed gear ratio and the first, the second, the fourth, and a fifth of the plurality of torque transmitting mechanisms are engageable to establish a first of the plurality of speed gear ratios;

a plurality of speed sensor assemblies each having a speed sensor and a speed sensor ring, and wherein each of the speed sensor rings are disposed on one of the first, second, or third members of one of the planetary gear sets or one of the interconnecting members, and a transmission control module having a control logic sequence, wherein the control module operates to control engagement of each of the plurality of torque transmitting mechanisms, and wherein each of the speed sensors is capable of detecting a rotational speed and the rotational direction of the corresponding speed sensor ring and sending a speed signal to the transmission control module; and wherein the torque transmitting mechanisms are selectively engageable in combinations of four to establish ten forward speed gear ratios and a reverse speed ratio between the input member and the output member and the control logic sequence includes:

a first control logic for detecting a transmission gear selection of the operator or driver;

a second control logic for deciding if the gear selection was for a reverse gear ratio or a forward gear ratio, directing the controller to continue to a third control logic if the reverse gear ratio is selected and directing the controller to continue to a seventh control logic if the forward gear ratio is selected;

the third control logic directs the transmission hydraulic controller to engage the second, the fourth, and the sixth of the plurality of the torque transmitting mechanisms;

a fourth control logic for detecting a slip speed of the third member of the first of the plurality of planetary gear sets;

a fifth control logic for directing the transmission hydraulic controller to engage the first of the plurality of the torque transmitting mechanisms if the slip speed indicates the reverse gear ratio or for returning the controller to the first control logic if the slip speed does not indicate the reverse gear ratio;

a sixth control logic for returning to the first control logic;

the seventh control logic directs the transmission hydraulic controller to engage the second, the fourth, and the fifth of the plurality of the torque transmitting mechanisms;

an eighth control logic for detecting the slip speed of the third member of the first of the plurality of planetary gear sets;

a ninth control logic for directing the transmission hydraulic controller to engage the first of the plurality of the torque transmitting mechanisms if the slip speed of the third member of the first of the plurality of planetary gear sets indicates a forward gear ratio or for returning the controller to the first control logic if the slip speed does not indicate a forward gear ratio; and a tenth control logic for returning to the first control logic.

2. The transmission of claim 1 wherein a first of the plurality of speed sensor assemblies has a first speed sensor ring disposed on a third member of a first of the plurality of planetary gear sets and a first speed sensor of the first of the plurality of speed sensor assemblies detects the rotational speed and direction of the third member of the first of the plurality of planetary gear sets.

3. The transmission of claim 1 wherein a second of the plurality of speed sensor assemblies has a second speed sensor ring disposed on a second member of a second of the plurality of planetary gear sets and a second speed sensor of the second of the plurality of speed sensor assemblies detects the rotational speed and direction of the second member of the second of the plurality of planetary gear sets.

4. The transmission of claim 1 wherein a third of the plurality of speed sensor assemblies has a third speed sensor ring disposed on a first of the plurality of interconnecting members and a third speed sensor of the third of the plurality of speed sensor assemblies detects the rotational speed and direction of the first of the plurality of interconnecting members.

5. The transmission of claim 1 wherein a fourth of the plurality of speed sensor assemblies has a fourth speed sensor ring disposed on a second member of a fourth of the plurality of planetary gear sets and a fourth speed sensor of the second of the plurality of speed sensor assemblies detects the rotational speed and direction of the second member of the fourth of the plurality of planetary gear sets.

6. The transmission of claim 1 wherein the first of the plurality of interconnecting members connects for common rotation a member of the first of the plurality of planetary gear sets with a member of the fourth of the plurality of planetary gear sets, the second of the plurality of interconnecting members connects for common rotation a member of the first of the plurality of planetary gear sets with a member of the second of the plurality of planetary gear sets, the third of the plurality of interconnecting members connects for common rotation a member of the second of the plurality of planetary gear sets with a member of the third of the plurality of planetary gear sets, and the fourth of the plurality of interconnecting members connects for common rotation a member of the third of the plurality of planetary gear sets and a member of the fourth of the plurality of planetary gear sets.

7. The transmission of claim 1 wherein the first of the plurality of torque transmitting mechanisms is selectively engageable to connect a member of the first of the plurality of planetary gear sets with the stationary member, the second of the plurality of torque transmitting mechanisms is selectively engageable to connect another member of the first of the plurality of planetary gear sets with the stationary member, a third of the plurality of torque transmitting mechanisms is selectively engageable to connect a member of the third of the plurality of planetary gear sets with an intermediate member, the fourth of the plurality of torque transmitting mechanisms is selectively engageable to connect another member of the third of the plurality of planetary gear sets with an intermediate member, the fifth of the plurality of torque transmitting mechanisms is selectively engageable to connect the another member of the third of the plurality of planetary gear sets with a member of the second of the plurality of planetary gear sets, and the sixth of the plurality of torque transmitting mechanisms is selectively engageable to connect the first of the plurality of interconnecting members with the intermediate member.

8. A transmission for a vehicle, the transmission including:
an input member;
an output member;
a first, second, third, and fourth planetary gear set each having a first, second, and third members, and wherein the input member is connected to one of the members one of the planetary gear sets and the output member is connected to another one of the members of one of the planetary gear sets;
a first interconnecting member connecting for common rotation a member of the first planetary gear set with a member of the fourth planetary gear set;
a second interconnecting member connecting for common rotation a member of the first planetary gear set with a member of the second planetary gear set:
a third interconnecting member connecting for common rotation a member of the second planetary gear set with a member of the third planetary gear set;
a fourth interconnecting member connecting for common rotation a member of the third planetary gear set and a member of the fourth planetary gear set;
six torque transmitting mechanisms each selectively connecting one of the first, second, or third members of one of the planetary gear sets with another of the first, second, or third members of one of the planetary gear sets or a stationary member;
a first speed sensor assembly having a speed sensor and a speed sensor ring, and wherein the speed sensor ring of the first speed sensor assembly is disposed on the third member of the first planetary gear set and the speed sensor of the first speed sensor assembly is fixed to the stationary member;
a transmission control module having a control logic sequence, wherein the control module operates to control engagement of each of the six torque transmitting mechanisms, and wherein the first speed sensor is capable of detecting a rotational speed and a rotational direction of the corresponding speed sensor ring and sending a speed signal to the transmission control module; and
wherein a first, a second, a fourth, and a sixth of the six torque transmitting mechanisms are engageable to establish a reverse speed gear ratio and the first, the second, the fourth, and a fifth of the six torque transmitting mechanisms are engageable to establish a first speed gear ratio.

9. The transmission of claim 8 wherein the control logic sequence includes:
a first control logic for detecting a transmission gear selection of the operator or driver;
a second control logic for deciding if the gear selection was for a reverse gear ratio or a forward gear ratio, directing the controller to continue to a third control logic if the reverse gear ratio is selected and directing the controller to continue to a seventh control logic if the forward gear ratio is selected;
the third control logic directs the transmission hydraulic controller to engage the second, the fourth, and the sixth of the plurality of torque transmitting mechanisms;
a fourth control logic for detecting a slip speed of the third member of the first of the plurality of planetary gear sets;
a fifth control logic for directing the transmission hydraulic controller to engage the first of the plurality of the torque transmitting mechanisms if the slip speed indicates a reverse gear ratio or for returning the controller to the first control logic if the slip speed does not indicate a reverse gear ratio;
a sixth control logic for returning to the first control logic.

10. The transmission of claim 9 wherein the control logic sequence further includes:

the seventh control logic directs the transmission hydraulic controller to engage the second, the fourth, and the fifth of the plurality of the torque transmitting mechanisms;
an eighth control logic for detecting the slip speed of the third member of the first of the plurality of planetary gear sets;
a ninth control logic for directing the transmission hydraulic controller to engage the first of the plurality of the torque transmitting mechanisms if the slip speed of the third member of the first of the plurality of planetary gear sets indicates a forward gear ratio or for returning the controller to the first control logic if the slip speed does not indicate a forward gear ratio; and
a tenth control logic for returning to the first control logic.

11. The transmission of claim 8 further including a second, third, and fourth speed sensor assembly each having a speed sensor fixed to the stationary member and a speed sensor ring, and wherein the speed sensor ring of the second speed sensor assembly is disposed on the second member of the second planetary gear set, the speed sensor ring of the third speed sensor assembly is disposed on the first interconnecting member, the speed sensor ring of the fourth speed sensor assembly is disposed on the second member of the fourth planetary gear set, each of the speed sensors detects the rotational speed and direction of the corresponding speed sensor ring and each speed sensor sends a speed signal to the transmission control module.

12. The transmission of claim 8 wherein the first torque transmitting mechanism is selectively engageable to connect a member of the first planetary gear set with the stationary member, the second torque transmitting mechanism is selectively engageable to connect another member of the first planetary gear set with the stationary member, a third torque transmitting mechanism is selectively engageable to connect a member of the third planetary gear set with an intermediate member, the fourth torque transmitting mechanism is selectively engageable to connect another member of the third planetary gear set with the intermediate member, the fifth torque transmitting mechanism is selectively engageable to connect the another member of the third planetary gear set with a member of the second planetary gear set, and the sixth torque transmitting mechanism is selectively engageable to connect the first interconnecting member with the intermediate member.

13. The transmission of claim 12 further including a second speed sensor assembly having a speed sensor ring disposed on the second member of the second planetary gear set and a speed sensor disposed on the stationary member that is capable of detecting the rotational speed and direction of the speed sensor ring of the second speed sensor assembly.

14. The transmission of claim 13 further including a third speed sensor assembly having a speed sensor ring disposed on the first interconnecting member and a speed sensor disposed on the stationary member that is capable of detecting the rotational speed and direction of the speed sensor ring of the third speed sensor assembly.

15. The transmission of claim 14 further including a fourth a third speed sensor assembly having a speed sensor ring disposed on the second member of the fourth planetary gear set and a speed sensor disposed on the stationary member that is capable of detecting the rotational speed and direction of the speed sensor ring of the fourth speed sensor assembly.

* * * * *